(12) United States Patent
Durt et al.

(10) Patent No.: US 9,744,887 B2
(45) Date of Patent: Aug. 29, 2017

(54) ADJUSTABLE SEAT AND METHOD FOR CONTROLLING SAME

(75) Inventors: Alexander Durt, Inning am Ammersee (DE); Rudolf Lein, Dachau (DE); Matthias Franz, Brannenburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1918 days.

(21) Appl. No.: 12/253,615

(22) Filed: Oct. 17, 2008

(65) Prior Publication Data
US 2009/0099490 A1   Apr. 16, 2009

Related U.S. Application Data

(63) Continuation of application No. PCT/EP2007/003281, filed on Apr. 13, 2007.

(30) Foreign Application Priority Data

Apr. 19, 2006 (DE) .......................... 10 2006 018 184

(51) Int. Cl.
*A61H 9/00* (2006.01)
*B60N 2/00* (2006.01)
*B60N 2/44* (2006.01)

(52) U.S. Cl.
CPC ......... *B60N 2/4492* (2015.04); *A61H 9/0078* (2013.01); *B60N 2/448* (2013.01); *B60N 2/449* (2013.01); *A61H 2201/0149* (2013.01); *A61H 2201/1215* (2013.01); *A61H 2201/1604* (2013.01); *A61H 2201/1614* (2013.01);
(Continued)

(58) Field of Classification Search
CPC .... A61H 9/0078; B60N 2/4492; B60N 2/448; B60N 2/449

USPC ....... 601/49, 51, 84, 85, 86, 89, 90, 97–103, 601/107, 108, 111, 115; 297/105, 284.1, 297/284.3, 284.6
See application file for complete search history.

(56) References Cited

U.S. PATENT DOCUMENTS 3,113,567 A * 12/1963 Russell ........................... 601/51
3,483,862 A * 12/1969 Takeuchi ...................... 601/150
(Continued)

FOREIGN PATENT DOCUMENTS

DE   38 30 235 C2   3/1990
DE   43 31 663 C1   3/1995
(Continued)

OTHER PUBLICATIONS

German Search Report dated Feb. 14, 2007 w/English translation of pertinent portion (nine (9) pages).
(Continued)

*Primary Examiner* — Justine Yu
*Assistant Examiner* — Timothy Stanis
(74) *Attorney, Agent, or Firm* — Crowell & Moring LLP (57) ABSTRACT

A seat having a backrest and a seat cushion includes rows of adjusting elements, respectively, which adjusting elements are arranged above one another, on both sides of the longitudinal center plane of the seat. By alternately applying the adjusting elements mutually arranged in a vertically staggered manner in the two halves of the seat, a rotational movement can be actively applied to a seat user's back and possibly pelvis, which rotational movement corresponds to the rotational movement of the back, and possibly of the pelvis, when walking.

16 Claims, 5 Drawing Sheets

(52) U.S. Cl.
  CPC .............. *A61H 2201/1623* (2013.01); *A61H 2201/1628* (2013.01); *A61H 2201/1671* (2013.01); *A61H 2201/5002* (2013.01); *A61H 2203/0431* (2013.01); *A61H 2205/081* (2013.01); *A61H 2205/086* (2013.01)

(56) References Cited

U.S. PATENT DOCUMENTS

| | | | |
|---|---|---|---|
| 3,835,844 A * | 9/1974 | Lang | 601/49 |
| 4,779,615 A * | 10/1988 | Frazier | 601/47 |
| 5,022,385 A * | 6/1991 | Harza | 601/149 |
| 5,127,708 A * | 7/1992 | Kishi et al. | 297/284.1 |
| 5,129,704 A * | 7/1992 | Kishi et al. | 297/284.1 |
| 5,135,282 A | 8/1992 | Pappers | |
| 5,263,765 A * | 11/1993 | Nagashima et al. | 297/284.6 |
| 5,320,409 A * | 6/1994 | Katoh et al. | 297/284.6 |
| 5,558,398 A | 9/1996 | Santos | |
| 6,074,006 A * | 6/2000 | Milosic et al. | 297/284.6 |
| 6,087,942 A * | 7/2000 | Sleichter et al. | 340/576 |
| 6,361,512 B1 * | 3/2002 | Mackay et al. | 601/150 |
| 6,551,450 B1 * | 4/2003 | Thomas et al. | 156/580.1 |
| 6,744,370 B1 * | 6/2004 | Sleichter et al. | 340/576 |
| 6,823,549 B1 * | 11/2004 | Hampton et al. | 5/713 |
| 7,152,920 B2 * | 12/2006 | Sugiyama et al. | 297/284.6 |
| 7,727,171 B2 * | 6/2010 | Ozaki et al. | 601/105 |
| 2006/0049678 A1 | 3/2006 | Kern et al. | |
| 2006/0217644 A1 | 9/2006 | Ozaki et al. | |

FOREIGN PATENT DOCUMENTS

| | | |
|---|---|---|
| DE | 197 26 409 A1 | 12/1998 |
| DE | 198 19 225 A1 | 11/1999 |
| DE | 199 10 877 A1 | 9/2000 |
| KR | 10 2005 0018913 A | 2/2005 |

OTHER PUBLICATIONS

International Search Report dated Aug. 3, 2007 w/English translation (ten (10) pages).

* cited by examiner

| a) | AD | ↔ | BC |
|---|---|---|---|
| b) | AF | ↔ | BE |
| c) | ADE | ↔ | BCF |
| d) | ADEH | ↔ | BCFG |
| e) | ADEG | ↔ | BCFH |

FIG. 6

| i) | I1 → I6 | ↔ | I6 → I1 |
|---|---|---|---|
| ii) | I1 → I3 | ↔ | I3 → I1 |
| iii) | I6 → I3 | ↔ | I3 → I6 |
| iv) | I1 → I3 | ↔ | I6 → I3 |
| v) | I3 → I1 | ↔ | I3 → I6 |

FIG. 7

NEW FIGURE
FIGURE 9

ADJUSTABLE SEAT AND METHOD FOR CONTROLLING SAME

CROSS-REFERENCE TO RELATED APPLICATIONS

This application is a continuation of PCT International Application No. PCT/EP2007/003281, filed Apr. 13, 2007, which claims priority under 35 U.S.C. §119 to German Patent Application No. DE 10 2006 018 184.0, filed Apr. 19, 2006, the entire disclosures of which are herein expressly incorporated by reference.

BACKGROUND AND SUMMARY OF THE INVENTION

The invention relates to an adjustable seat, and method for controlling same, having a backrest and a seat cushion. A plurality of adjusting elements are arranged in the backrest inside the contact surface of the backrest facing a user. The adjusting elements can carry out a lifting movement directed approximately perpendicularly to the contact surface.

A seat having a backrest is known from U.S. Pat. No. 5,558,398, which seat has a plurality of lifting elements arranged, in pairs, symmetrically with respect to a vertical axis of the backrest.

Furthermore, International patent document WO 2004/026623 A1 describes a seat having a plurality of elements in the backrest and seat cushion, which elements can be acted upon by pressure and by which the seat contour can be influenced for achieving various massaging effects.

It is an object of the invention to further develop a seat of the type known from U.S. Pat. No. 5,558,398 in the sense of an improved mobilization, particularly of the seat user's back.

This object is achieved by a seat according to the invention having a backrest and a seat cushion. A plurality of adjusting elements are arranged in the backrest inside the contact surface of the backrest facing a user. The adjusting elements can carry out a lifting movement directed approximately perpendicularly to the contact surface. A control is provided, by which the adjusting elements, in a mutually time-coordinated sequence, are activated such that a rotational movement is applied to the user's back, which rotational movement is comparable to the rotational movement during walking.

According to the invention, adjusting elements in the backrest of the seat are arranged and designed such that they can carry out a lifting motion in a direction approximately perpendicular with respect to the seat user's contact surface. The adjusting elements are provided on certain regions of the seat back in order to achieve active motion of the back there by a targeted adjustment onto the seat user. The adjusting elements are arranged on the right and the left of the seat user's spinal column, preferably symmetrically with respect to the longitudinal center plane of the backrest. In each case, two adjusting elements are provided in the upper region of the backrest, thus in the region which is situated opposite the seat user's shoulder. These two adjusting element in the shoulder region are supplemented by two central adjusting elements in the seat user's chest region and/or by two adjusting elements in the lower region of the backrest, which is situated opposite a seat user's lumbar region. As a result of the arrangement of the adjusting elements in the described regions of the backrest according to the invention, which regions correspond to certain regions of the seat user's back, by means of the lifting motion of the adjusting elements, a targeted active movement of the back (as well as individual spinal column sections or vertebrae segments of the back) can be achieved, as described in detail in the following.

As a result of the control method according to the invention, the adjusting elements are activated such that the seat user's back is rotatorily mobilized. This active rotary mobilization causes a movement of the person's back that corresponds to the movement of the spinal column while walking. This thus simulates a natural motion sequence which, as a result of the person's static posture, cannot be actively carried out by a seat user himself. By means of the rotating movement exercised upon the back by the adjusting elements, the phenomena of fatigue and tension can be counteracted extremely effectively.

If there is a sufficient lifting path, the adjusting elements cause a mobilization of individual vertebrae with respect to one another or a mobilization of vertebra segments. The acted-upon vertebrae or the acted-upon vertebrae segment experiences a micro movement with respect to the adjacent vertebra or vertebra segment. This micro movement is known from the "manual therapy" of the spinal column in medicine and is successfully used for mobilizing vertebrae and vertebra segments in order improve movement, which becomes noticeable as an improvement of comfort.

The rotatory mobilization is preferably achieved by four or six adjusting elements in the backrest, which rotate the seat user's back. As described above, the adjusting elements in the shoulder region together with the adjusting elements in the thoracic and/or lumbar region are appropriately controlled.

In a preferred embodiment of the invention, the adjusting elements are arranged in the lateral edge regions of the backrest such that they can actively move the seat user's back in a region situated as far as possible to the outside, in order to achieve a lever effect as large as possible. Naturally, the adjusting elements are to be placed such that they can also still operate effectively in the case of smaller and narrower seat users.

In an advantageous further development of the invention, the adjusting elements in the backrest are supplemented by adjusting elements in the seat cushion, as known per se from German patent document DE 197 26 409 A1. This document describes a seat cushion with two adjusting elements which carry out a lifting movement in a direction approximately perpendicular to the surface of the seat cushion. The adjusting elements are moved in an alternating fashion and thereby generate a tilting movement of the seat user's pelvis similar to the movement of the pelvis while walking.

As a result of this combination of adjusting elements in the backrest and the seat cushion, in connection with a corresponding control, a three-dimensional rotational movement of the back and the pelvis is achieved. The adjusting elements in the backrest together with the adjusting elements in the seat cushion carry out an adjusting movement in opposite directions. This supplementation of the rotational movement of the back by the tilting movement of the pelvis is particularly advantageous for a mobilization of the seat user's spinal column as a whole. This rotatory mobilization is a simulation of the rotational movement which the back and the pelvis carry out when a person is walking.

In the described embodiment of the invention, four or six adjusting elements are therefore provided in the backrest of the seat and at least two additional adjusting elements are provided in the seat cushion. Naturally, a number of adjusting elements deviating therefrom may also be constructed in the seat.

Adjusting elements of a different size, a different mechanical construction, and/or of a different geometry may be used.

In principle, the adjusting elements are symmetrically arranged in the right and left half of the seat. However, deviating therefrom, an asymmetrical distribution of the adjusting elements at least in sections is also contemplated, depending on the further development of the seat.

The adjusting elements are preferably arranged between the basic springs, i.e., the force-absorbing structure of the seat, and the cushioning of the seat, as a rule, a foam material. As a result of this placement of the adjusting elements between the frame and the seat foam, the adjusting elements are prevented from acting in a comfort-reducing spot-type manner upon the seat user's back and, possibly, also upon his posterior. To the contrary, as a result of the described arrangement, a pressure distribution is achieved over a larger surface while the adjusting elements do not act upon the seat user's body in an excessively punctiform manner. However, the described arrangement of the adjusting elements simultaneously ensures a sufficiently precise localized force effect upon the seat user's back and possibly his posterior.

Supplementary to the adjusting elements, another embodiment of the invention provides a plurality of massaging elements arranged above one another in the backrest, as known per se from German patent document DE 38 30 235 C2 or DE 201 08 345 U1. In the case of DE 38 30 235 C2, the massage elements are controlled such that, as a result of a progressive action upon adjacent massaging elements, a roller-type wave motion is created that runs through along the vertical dimension of the backrest.

The wave motion applied to the seat user's back provides a massage of the muscular system along the spinal column, predominantly of the muscles next to the spinal column. As a result of this direct mechanical effect on the muscular system, the blood circulation of the muscular system of the back is increased with the result of a regeneration and a subsequent relaxation of the muscle system, including the surrounding body structures (cartilage, ligaments, tendons). In addition, the spinal column is slightly moved, in the sense of a periodic straightening of the back, as a result of the applied wave motion. This movement of the spinal column increases the positive effects of the rotatory mobilization in that, here also, changing pressures are generated upon the intervertebral disks, with the result of an improved supply to the intervertebral disk cartilage.

The seat according to the invention can be used particularly advantageously in motor vehicles because here the user, in many cases, remains statically seated for extended periods of time. And, because of the circumstances existing in a vehicle, in the case of the driver, an active movement by the driver is not possible as a result of the traffic situation. As a result of the rotatory mobilization, the spinal column is moved in a manner corresponding to the natural course of movement when walking. This movement has the result that changing pressures are created upon the intervertebral disks, which promote the supply of nutrients to the intervertebral disk cartilage by way of a diffusion process. This changing load upon the intervertebral disks therefore promotes their regeneration. The rotatory mobilization also acts upon the muscular system, so that muscular tenseness is successfully avoided or at least reduced.

The lifting movements of the adjusting elements should be restricted in order to preclude such movements from being inadvertently transmitted to the steering wheel by way of the driver's arms, which would negatively influence driving activities. In addition to this direct introduction of movements by way of the driver's arms, it should also be observed when proportioning the lifting movements that the movement receptors in the driver's arms are not addressed, so that no distraction is caused during driving.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
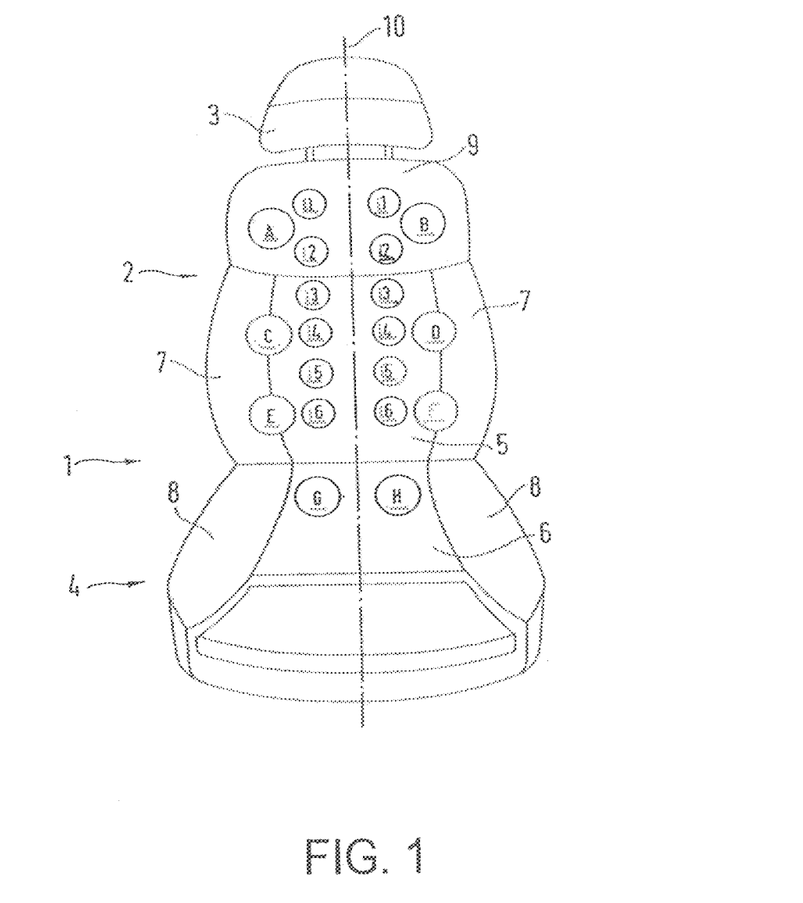
FIG. 1 is a perspective view of a first embodiment of a seat according to the invention, having a plurality of schematically illustrated adjusting elements and massaging elements.

FIG. 1 illustrates a seat 1 having a backrest 2, a headrest 3 and a seat cushion 4. Central contact surfaces 5 and 6 of the backrest 2 and the seat cushion 4, respectively, are adjoined by lateral cheeks 7 and 8 of the backrest 2 and the seat cushion 4, respectively. In the upper region of the backrest 2, a shoulder section 9 is provided without any lateral cheeks. The longitudinal center plane of the seat 1 has the reference number 10.

According to the invention, six adjusting elements A-F are provided in the backrest 2. The adjusting elements A, C and E are arranged in a mirror-symmetrical manner with respect to the adjusting elements B, D and F. The right and left sides of the seat 1 each have a series of adjusting elements A, C, E and B, D, F, respectively, which are arranged above one another. The adjusting elements A to F may be controlled individually.

The adjusting elements A and B are arranged in the shoulder regions of the backrest 2, are situated relatively far on the outside (laterally outward) and, relative to the vertical height dimension of the shoulder section 9, are situated approximately in the center in the shoulder section 9. The adjusting elements C and E, as well as D and F, respectively, are arranged in the transition region between the central contact surfaces 5 and the cheeks 7 of the backrest 2. In this case, the adjusting elements C and D are situated approximately in the center of the vertical dimension of the backrest 2, thus, in the chest region of an assigned user of the seat 1. The adjusting elements E and F are arranged in the lower section of the backrest 2 and are thereby assigned to a user's lumbar region.

The seat cushion 4 has two adjusting elements G and H, which are arranged approximately symmetrically with respect to the longitudinal center plane 10. The adjusting elements G and H are arranged in that region of the seat cushion 4 that is opposite a seat user's seat bone protuberances.

The adjusting elements A to H are arranged in a covered manner below the seat user's contact surface with the seat 1. They are preferably situated between the basic spring frame and the upholstery of the seat. The adjusting elements A to H are constructed as lifting elements and carry out a movement approximately perpendicular to the occupant's contact surface at the seat 1. As a result, a force and consequently a movement is exercised on a seat user's back or posterior. By means of the lifting movement of the adjusting elements A to H, a massaging effect is only intended and achieved to a minor degree. The mobilization of the spinal column is the main objective.

FIG. 1 shows a particularly preferred arrangement of the adjusting elements A to F, the illustration being abstracted particularly with respect to the shape of the adjusting elements A to F. FIGS. 2 to 5 show alternative arrangements and shapes of adjusting elements.

Figure 2:
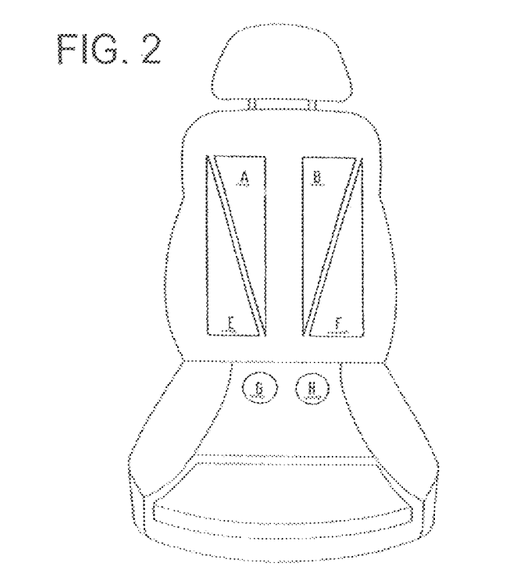
FIGS. 2 to 5 are views corresponding to FIG. 1, with alternative embodiments and arrangements of adjusting elements.

FIG. 2 illustrates pyramidal adjusting elements A, B, E and F, having triangular lateral surfaces in the frontal view of the seat. When one of the adjusting elements A, B, E or F is activated, a wedge-shape formation is created, with a maximal lift in the region of the base side of the triangular lateral surface. The maximal lift corresponds to the lift of the adjusting elements A, B, E and F of FIG. 1. However, a soft transition takes place in this case as a result of the wedge-shaped tapering of the adjusting elements A, B, E and F of FIG. 1 in the direction of the adjusting element situated vertically above and below.

Figure 3:
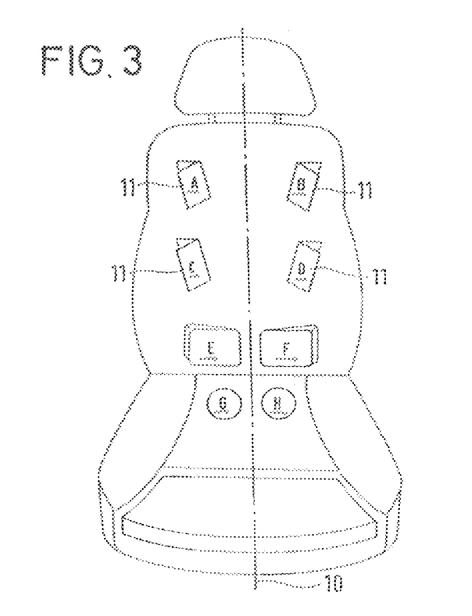

FIG. 3 shows another further development similar in practice to the adjusting elements A to F having the wedge shapes. In the deactivated position of the adjusting elements A to F, these are essentially flat formations which are rectangular in the top view. When the adjusting elements A to F are activated, they "unfold" along their arrow sides 11 facing the longitudinal center plane 10 of the seat 1. This results in a maximal lift of the adjusting elements A to F in the laterally exterior regions of the backrest 2 corresponding to the representation of FIG. 1. In the case of comparatively flat backrests 2, this wedge shape of the adjusting elements A to F is an advantage because, in the case of such backrests 2, a wedge-shaped distance exists between the plane contact surface of the backrest 2 and the seat user's back, which is curved in its marginal areas. This wedge-shaped distance is advantageously compensated by the wedge-shaped adjusting elements A to F. In addition, it is achieved as a result of the wedge-shaped adjusting elements A to F that the lifting movement is applied perpendicular to the occupant's back. Furthermore, the narrow sides 11 of the adjusting elements C and D are slightly adjusted with respect to the longitudinal center plane 10 in order to achieve a particularly good adaptation to the seat user's back in the thoracic region.

Figure 4:
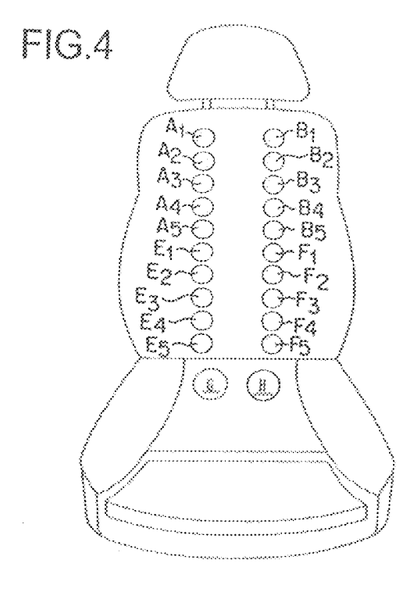

In the case of the backrest 2 according to FIG. 4, five adjusting elements $A_1, A_2, A_3, A_4, A_5$ and $B_1, B_2, B_3, B_4, B_5$ and $E_1, E_2, E_3, E_4, E_5$, and $F_1, F_2, F_3, F_4, F_5$ respectively are provided instead of each of the adjusting elements A and B and E and F respectively of FIG. 1. As a result of this subdivision, a similar effect can be achieved by way of graduated lifting paths as in the case of pyramidal adjusting elements A, B, E and F according to FIG. 2, specifically a tapering flow, starting from the adjusting elements $A_1, B_1, E_5$ and $F_5$ respectively with a maximal lift. As an alternative, the adjusting elements $A_3, B_3, E_3$ and $F_3$ respectively may carry out a maximal lift.

Figure 5:
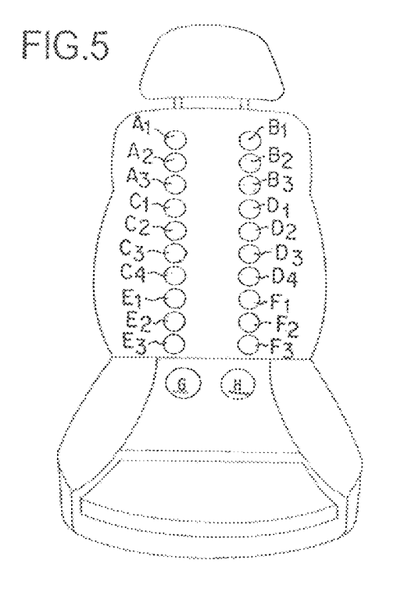

An analogous situation exists according to FIG. 5 for the adjusting elements $A_1$ to $F_3$. As illustrated in FIG. 5, instead of each of the adjusting elements A to F of FIG. 1, three or four adjusting elements $A_1, A_2, A_3$ to $F_1, F_2, F_3$ respectively are provided in order to achieve soft transitions as a result of a correspondingly graduated control.

Figure 6:
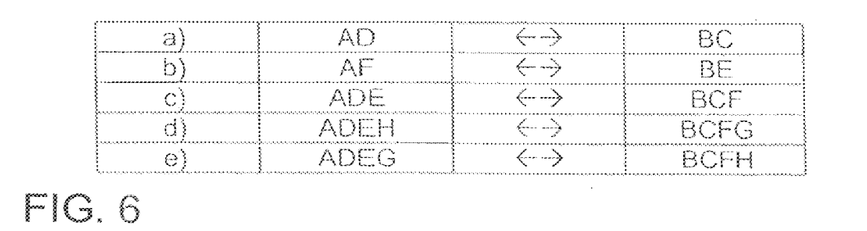
FIG. 6 is a chart for generating various rotational movements by the adjusting elements.

FIG. 6 is a table-type overview of preferred controls of the adjusting elements A to H in order to achieve a rotatory mobilization of the back or of the back and the pelvis.

In the case of adjusting pattern a), the adjusting elements A and D, as well as B and C, are activated in an alternating manner, so that an adjusting movement onto the seat user's back in each case takes place in a diagonally opposite, and therefore vertically staggered, manner in the right and the left half of the backrest 2. As a result, a "single rotation" of the back is achieved. This rotational motion of the back generated by two diagonally opposite adjusting elements is relatively pronounced.

Instead of the adjusting elements C and D, the adjusting elements E and F may also be activated with the same effect as described above, but with a larger distance between the adjusting elements A, B and E, F respectively now arranged in the shoulder region and in the lumbar region. Here, the adjusting pattern b) is obtained.

In the next stage c) of the mobilization, the adjusting elements A, D and E are activated alternately with adjusting elements B, C and F. In other words, a shoulder lifting element A and B respectively and a lumbar lifting element E and F respectively in the right and left half respectively of the backrest 2 are activated together with a thoracic lifting element D and C respectively in the left and right half of the backrest 2 respectively. As a result, in contrast to the above-described "single rotation", a "segment rotation" is achieved. At least three adjusting elements always participate in the "segment rotation", in which case, in contrast to the single rotation, the rotation of the back is reduced because the back only carries out a reduced rotational movement with respect to the central adjusting element C and D, respectively, in the thoracic region. As a result, the movement of the shoulder belt is considerably reduced, which is advantageous with respect to the transmission of the lifting movement into the arms of the driver of a motor vehicle.

By combining the four or six adjusting elements A to F in the backrest 2 with the two adjusting elements G and H in the seat cushion 4, a three-dimensional movement action can be achieved upon the seat user. For this purpose, the adjusting elements A, D and E in the backrest 2 are moved together with the adjusting element H in the seat cushion 4, so that a "zigzag line" of activated adjusting elements is obtained in the case of this adjusting pattern d). The actuating of the adjusting elements B, C, F and G alternates periodically.

Adjusting pattern d) simulates the physiological motion sequence of the spinal column and the pelvis, as occurs when a person walks.

According to adjusting pattern e), the activation of the adjusting elements A, D and E may also be combined with the activation of adjusting element G, alternating with an activation of the adjusting elements B, C, F and H.

By means of the above-described activation patterns, a movement is applied to the back, and possibly to the pelvis, of a seat user, which is predominantly determined by rotation and which is adapted to the natural movement when walking. As a result, an anatomically meaningful motion sequence is externally applied to the occupant, who is actually in a static sitting position. This motion sequence mobilizes the spinal column and the pelvis and counteracts muscular tenseness.

Additionally, two rows of massaging elements 11, 12, 13, 14, 15 and 16 are arranged in the center region 5 of the backrest, as shown in FIG. 1, each at the same distance on the right and the left from the longitudinal center plane 10.

Figure 7:
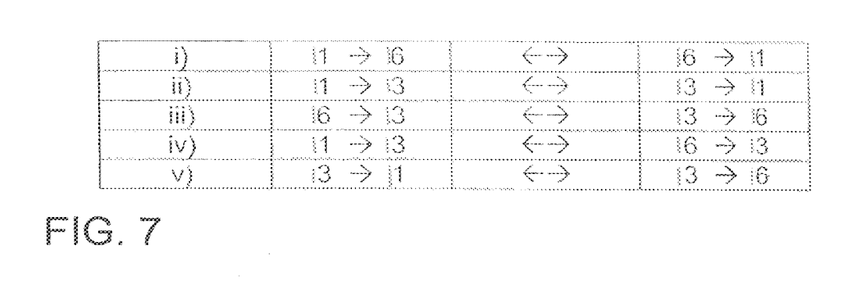
FIG. 7 is a chart for producing various massaging effects by the massaging elements.

FIG. 7 illustrates in table form five exemplary sequences i) to v) for activating the massage elements 11 to 16.

According to sequence i), a wave motion is generated, which passes through in the downward direction along a seat user's back and alternates with a wave motion which passes through in the upward direction.

As an alternative, according to sequence ii) and iii) respectively, the wave motion may also only take place in the upper or in the lower half of the backrest 2.

In sequence iv) according to FIG. 7, a wave motion first takes place from the top to the center of the backrest 2, and subsequently, a wave motion takes place from below also to the center of the backrest 2. In a preferred embodiment of the invention, these two wave motions take place simultaneously, so that a wave is created on the backrest 2 that runs in the downward direction and in the upward direction to the center.

In sequence v) according to FIG. 7, the wave motion starts out from the center of the backrest 2 in the upward and in the downward directions, respectively. Here also, the motion previously takes place simultaneously in both directions.

Figure 8:
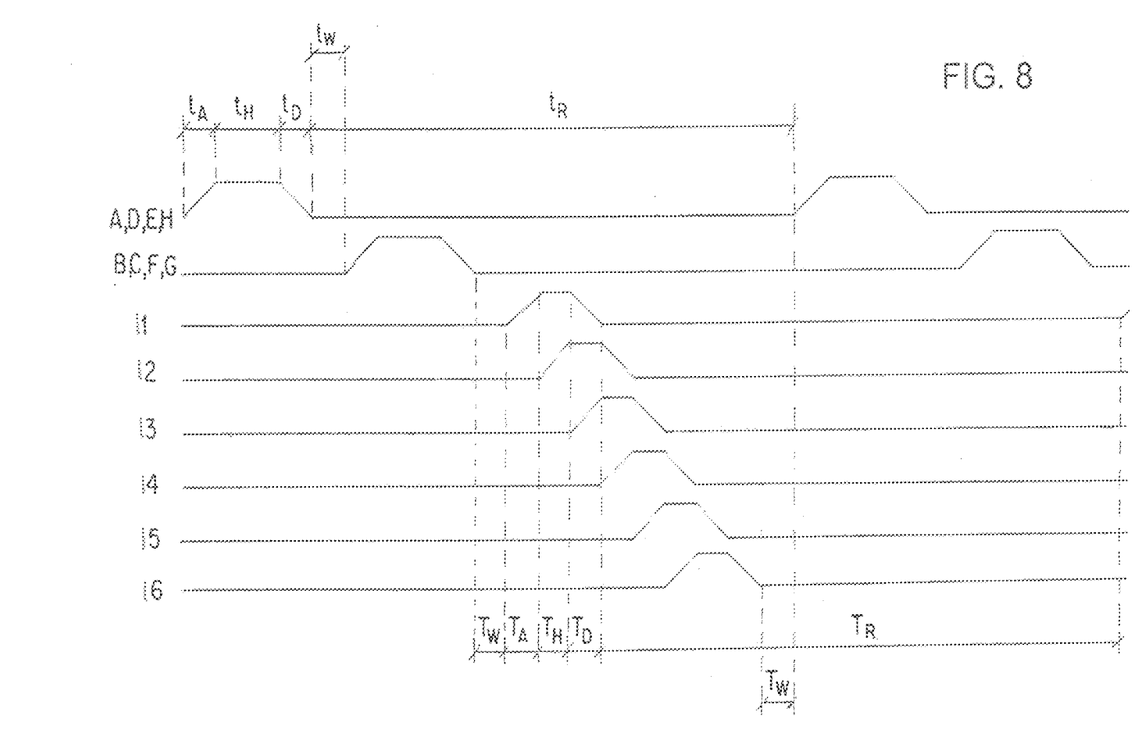
FIG. 8 is a diagram illustrating the time sequence of the rotation and of the massage.

FIG. 8 illustrates an exemplary timing sequence for the activation of the adjusting elements A to H, as well as of the massaging elements 11, 12, 13, 14, 15 and 16. The illustrated and described time data is provided for example only.

The adjusting elements A, D, E, H reach their maximal lift within an activation time $t_A$ of 5 seconds. The holding time $t_H$ amounts to 10 seconds. This is followed by a deactivation time $t_D$ of again 5 seconds. The next cycle starts after a rest period $t_R$ of 150 seconds.

After the termination of the lifting cycle of the adjusting elements A, D, E, H and a waiting time $t_W$ of 5 seconds, the lifting cycle of the adjusting elements B, C, F, G starts, preferably with the same parameters $t_A$, $t_H$ and $t_D$.

The cycles of the adjusting elements A to H are followed by the massaging cycles of the massaging elements 11, 12, 13, 14, 15 and 16, with a waiting time $T_W$ of 5 seconds. The activating times $T_A$, the holding times $T_H$ and the deactivating times $T_D$ each amount to 5 seconds. The deactivation of the massaging element 11 is followed without a waiting time $T_W$ immediately by the activation of the massaging element 12 and so on. After the passage of the last massaging element 16, after a waiting time $T_W$, the activation of the adjusting elements A, D, E, H begins again.

In the present example, the resting period $t_R$ between two lifting cycles of the adjusting elements A, D, E, H is correspondingly long because of the intermediately connected massaging cycles. In the case of a seat 1 without massaging elements 11, 12, 13, 14, 15 and 16 (or in the case of deactivated massaging elements 11, 12, 13, 14, 15 and 16), the resting period $t_R$ is made shorter in order to avoid any long-lasting inactivity period of the seat.

The times indicated as examples, depending on the type of control, may clearly deviate from the above-mentioned data. In contrast to the above-described embodiment, in which a massaging cycle lasts 15 seconds, the duration of a massaging cycle may, for example, be between 5 and 120 seconds. Naturally, deviating from the "symmetrical" design of the rotation cycles and the massaging cycles, these may also take place "asymmetrically". Basically, all indicated times may be calculated individually. Waiting periods $t_W$ and $T_W$ may be eliminated or added.

The lift of the adjusting elements A to H amounts, for example, to 8 centimeters. However, this adjusting path should not be equated with the lifting path which is in effect on the seat user's back, because the basic springing and the cushioning of the seat 1 naturally consume a large portion of the effective lifting path.

Figure 9:
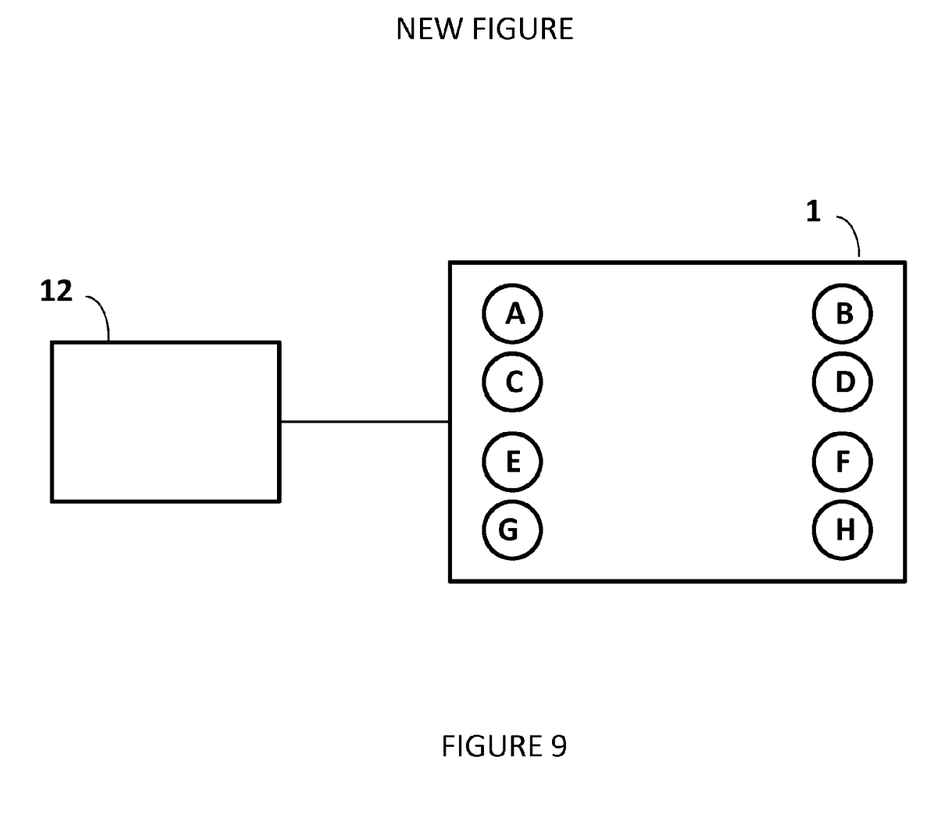
FIG. 9 is a diagram illustrating a control unit operatively coupled with the adjusting elements.

FIG. 9 is a diagram illustrating a control unit 12 operatively coupled with adjusting elements A, B, C, D, E, F, G and H.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat, comprising:
   a backrest;
   a seat cushion;
   a plurality of adjusting elements operatively arranged in the backrest in order to carry out a lifting movement directed approximately perpendicularly to a contact surface of the backrest adapted to face a user, wherein the backrest comprises a plurality of regions including a right shoulder region, a left shoulder region, a right thoracic region, a left thoracic region, a right lumbar region and a left lumbar region, and wherein each of the plurality of regions has at least one of the plurality of adjusting elements arranged therein; and
   a control unit operatively coupled with the plurality of adjusting elements, the control unit controlling activation of the plurality of adjusting elements in a time-coordinated sequence whereby simultaneous activation of adjusting elements arranged in either vertically or horizontally adjacent regions of the backrest is avoided, and wherein the plurality of adjusting elements are adapted to apply a rotational movement to a user's back that is comparable to a rotational movement that occurs during walking, wherein:
   a first adjusting element of the plurality of adjusting elements is arranged in the right shoulder region;
   a second adjusting element of the plurality of adjusting elements is arranged in the left shoulder region;
   a third adjusting element of the plurality of adjusting elements is arranged in the right thoracic region;
   a fourth adjusting element of the plurality of adjusting elements is arranged in the left thoracic region;
   a fifth adjusting element of the plurality of adjusting elements is arranged in the right lumbar region;
   a sixth adjusting element of the plurality of adjusting elements is arranged in the left lumbar region; and
   wherein the control unit activates the adjusting elements in accordance with one of the following sequences:
   a) only the first and fourth adjusting elements are activated simultaneously and alternate with only the second and third adjusting elements being activated simultaneously,
   b) only the first and sixth adjusting elements are activated simultaneously and alternate with only the second and fifth adjusting elements being activated simultaneously, and
   c) only the first, fourth and fifth adjusting elements are activated simultaneously and alternate with only the second, third and sixth adjusting elements being activated simultaneously.

2. The seat according to claim 1, further comprising:
   at least two seat adjusting elements operatively arranged in the seat cushion; and wherein the at least two seat adjusting elements are activated via the control unit in a time-coordinated manner and in a manner that is time-coordinated with respect to the plurality of adjusting elements in the backrest; and wherein the plurality of adjusting elements are adapted to apply the rotational movement to the user's back and pelvis, which rotational movement is comparable to the rotational movement of the back and pelvis that occurs during walking.

3. The seat according to claim 2, further comprising a plurality of massage elements arranged along a vertical height dimension of the backrest.

4. The seat according to claim 3, wherein the massage elements are arranged symmetrically with respect to a longitudinal center plane of the backrest in two rows, said rows being laterally interior of the adjusting elements.

5. The seat according to claim 4, wherein each row comprises six massage elements.

6. The seat according to claim 1, wherein the at least two seat adjusting elements, respectively, are arranged in a right and a left half of the seat cushion.

7. The seat according to claim 6, wherein the at least two seat adjusting elements are adapted to be arranged in a contact area of the user's seat bone protuberances.

8. The seat according to claim 1, wherein the adjusting elements are operatively arranged such that:
a seventh seat adjusting element is in a right pelvic region;
an eighth seat adjusting element is in a left pelvic region; and
wherein the control unit performs one of the following control sequences:
a) only the first, fourth, fifth and eighth adjusting elements are activated simultaneously and alternate with only the second, third, sixth and seventh adjusting elements being activated simultaneously;
b) only the first, fourth, fifth and seventh adjusting elements are activated simultaneously and alternate with only the second, third, sixth and eighth adjusting elements being activated simultaneously.

9. The seat according to claim 1, further comprising a plurality of massage elements arranged along a vertical height dimension of the backrest.

10. The seat according to claim 9, wherein the massage elements are arranged symmetrically with respect to a longitudinal center plane of the backrest in two rows, said rows being laterally interior of the adjusting elements.

11. The seat according to claim 10, wherein each row comprises six massage elements.

12. The seat according to claim 9, wherein said control unit controls the plurality of massage elements which are adapted to affect a wave motion upon the seat user's back.

13. The seat according to claim 12, wherein the control unit activates the massage elements in coordination with respect to the activation of the adjusting elements.

14. A method for controlling an adjustable seat having a backrest and seat cushion, in which backrest a plurality of adjusting elements are operatively arranged to perform a lifting movement directed approximately perpendicular to a contact surface of the backrest, wherein the backrest comprises a plurality of regions including a right shoulder region, a left shoulder region, a right thoracic region, a left thoracic region, a right lumbar region and a left lumbar region, wherein a first adjusting element of the plurality of adjusting elements is arranged in the right shoulder region, a second adjusting element of the plurality of adjusting elements is arranged in the left shoulder region, a third adjusting element of the plurality of adjusting elements is arranged in the right thoracic region, a fourth adjusting element of the plurality of adjusting elements is arranged in the left thoracic region, a fifth adjusting element of the plurality of adjusting elements is arranged in the right lumbar region, and a sixth adjusting element of the plurality of adjusting elements is arranged in the left lumbar region, the method comprising the acts of:
activating the adjusting elements in a time-coordinated sequence whereby simultaneous activation of adjusting elements arranged in either vertically or horizontally adjacent regions of the backrest is avoided;
wherein said time-coordinated sequence applies a rotational movement to the user's back when arranged against the contact surface of the backrest, said rotational movement being comparable to a rotational movement experienced by a person during walking,
wherein said time-coordinated sequence comprises one of the following:
a) only the first and fourth adjusting elements are activated simultaneously and alternate with only the second and third adjusting elements being activated simultaneously,
b) only the first and sixth adjusting elements are activated simultaneously and alternate with only the second and fifth adjusting elements being activated simultaneously, and
c) only the first, fourth and fifth adjusting elements are activated simultaneously and alternate with only the second, third and sixth adjusting elements being activated simultaneously.

15. A seat, comprising:
a backrest;
a seat cushion;
a plurality of adjusting elements operatively arranged in the backrest in order to carry out a lifting movement directed approximately perpendicularly to a contact surface of the backrest adapted to face a user, wherein the backrest comprises a plurality of regions including a right shoulder region, a left shoulder region, a right thoracic region, a left thoracic region, a right lumbar region and a left lumbar region, and wherein each of the plurality of regions has at least one of the plurality of adjusting elements arranged therein; and
a control unit operatively coupled with the plurality of adjusting elements, the control unit controlling activation of the plurality of adjusting elements in a time-coordinated sequence in accordance with one of the following sequences:
a) only the adjusting elements in the right shoulder region and left thoracic region are activated simultaneously, alternating with only the adjusting elements in the left shoulder and right thoracic region being activated simultaneously,
b) only the adjusting elements in the right shoulder region and left lumbar region are activated simultaneously, alternating with only the adjusting elements in the left shoulder region and right lumbar region being activated simultaneously, and
c) only the adjusting elements in the right shoulder region, left thoracic region and right lumbar region are activated simultaneously, alternating with only the adjusting elements in the left shoulder region, right thoracic region and left lumbar region being activated simultaneously.

16. The seat according to claim 15, wherein the seat cushion comprises a right pelvic region and a left pelvic region, each of which has at least one of the plurality of adjusting elements arranged therein, and wherein the control unit is further configured to control activation of the plurality of adjusting elements in a time-coordinated sequence in accordance with one of the following sequences:

d) only the adjusting elements in the right shoulder region, left thoracic region, right lumbar region and left pelvic region are activated simultaneously, alternating with only the adjusting elements in the left shoulder region, right thoracic region, left lumbar region and right pelvic region being activated simultaneously, and e) only the adjusting elements in the right shoulder region, left thoracic region, right lumbar region and right pelvic region are activated simultaneously, alternating with only the adjusting elements in the left shoulder region, right thoracic region, left lumbar region and left pelvic region being activated simultaneously.

* * * * *